Nov. 23, 1926. 1,608,019
J. B. FENDER
WATER PURIFYING APPARATUS
Filed March 15, 1926 3 Sheets-Sheet 2
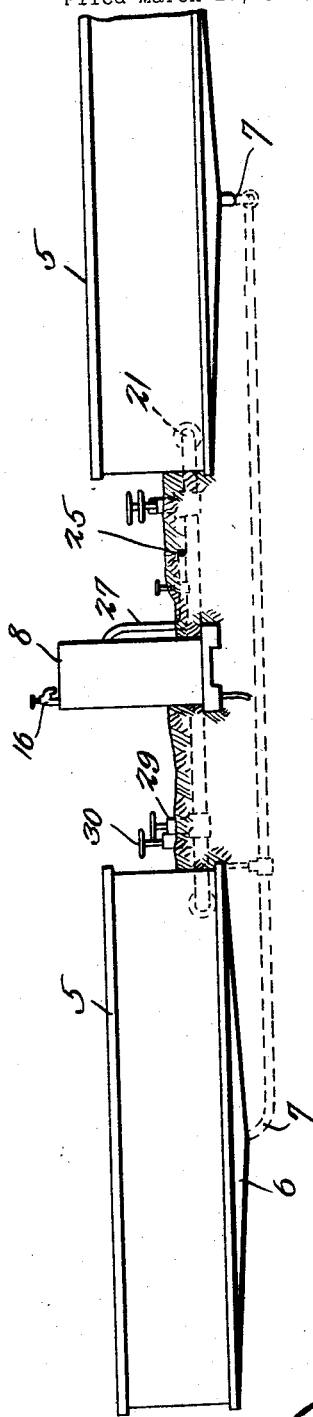
J. B. Fender
Inventor

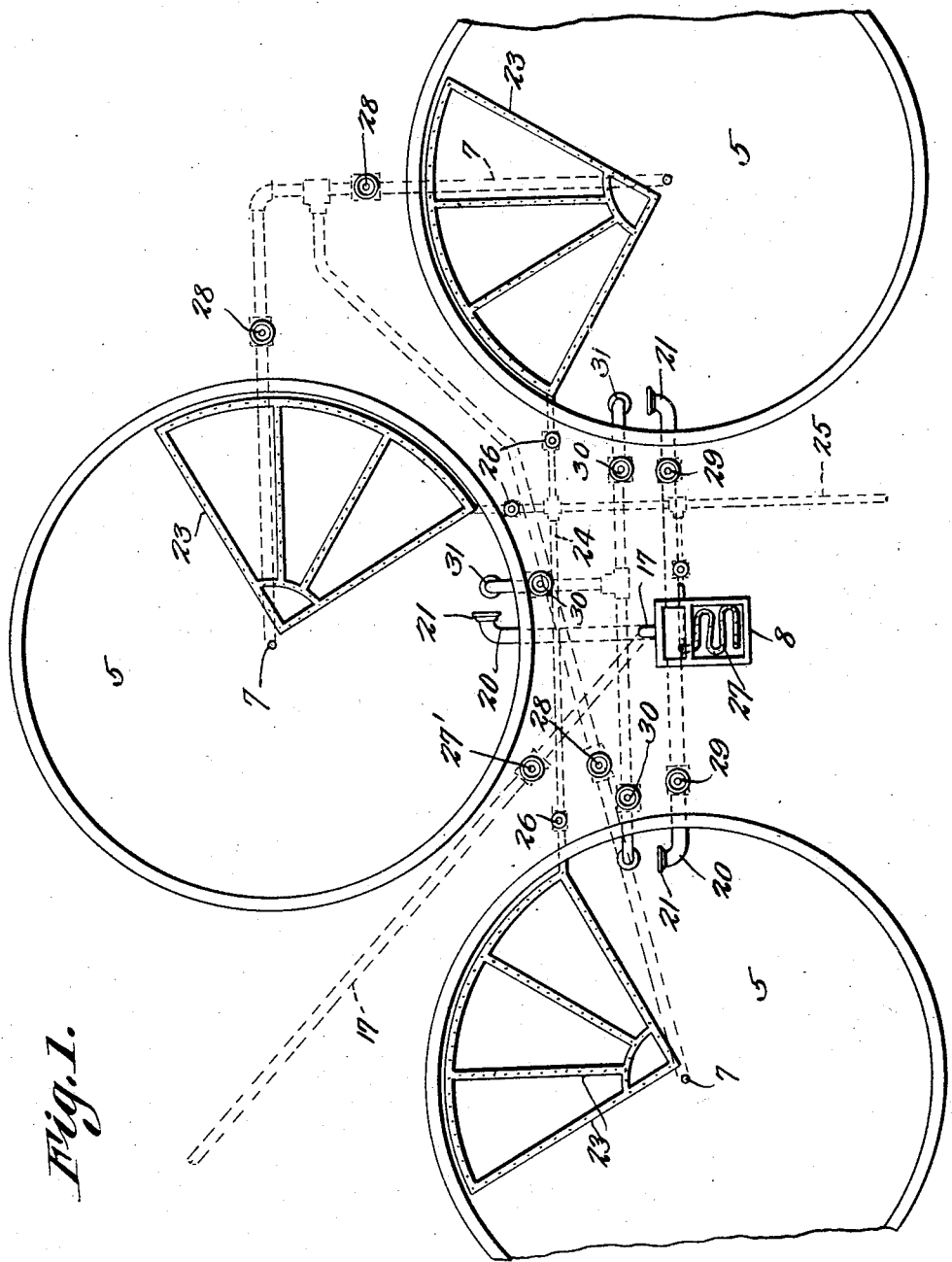

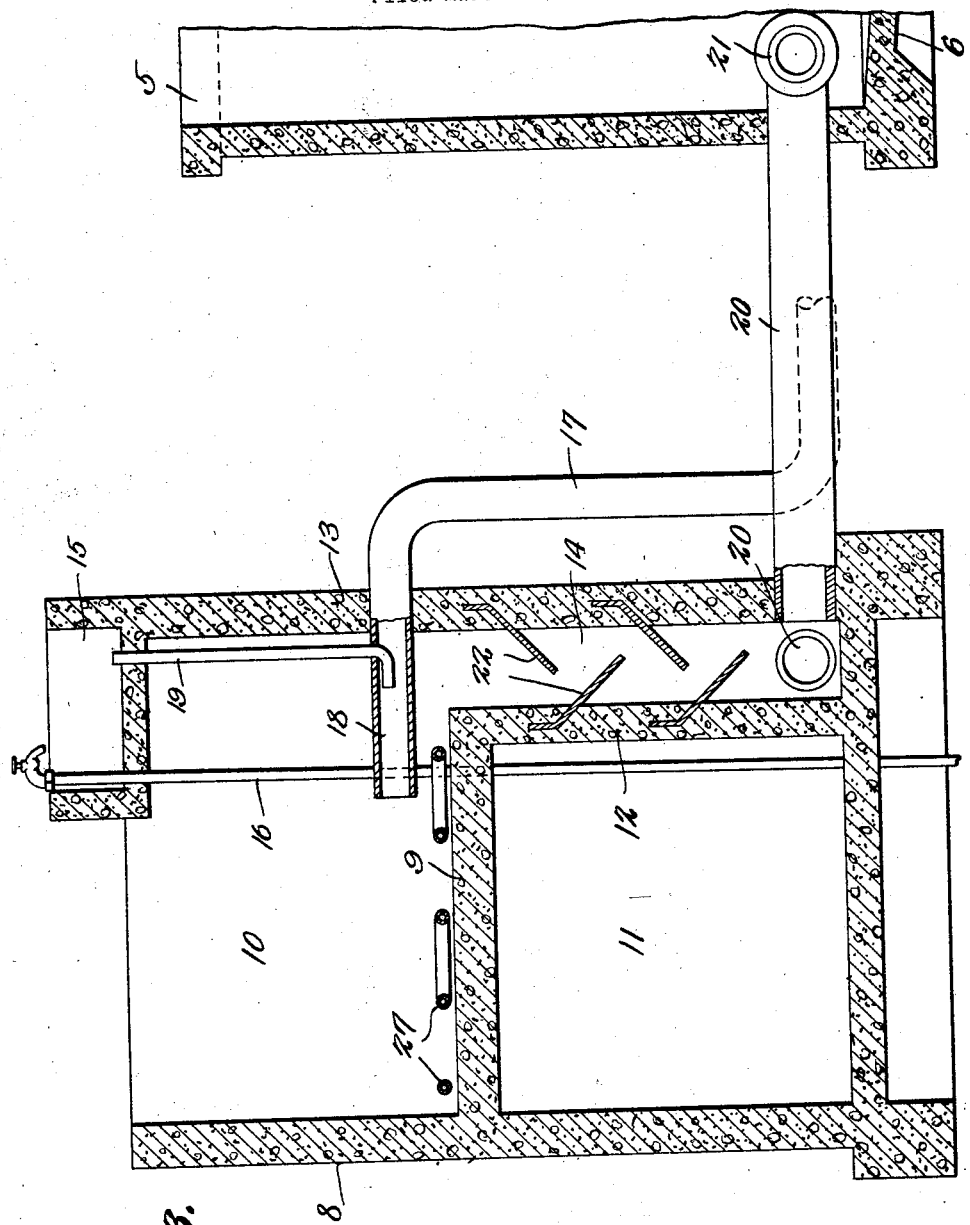

Patented Nov. 23, 1926.

1,608,019

UNITED STATES PATENT OFFICE.

JOHN BROWN FENDER, OF KAUFMAN, TEXAS.

WATER-PURIFYING APPARATUS.

Application filed March 15, 1926. Serial No. 94,893.

This invention relates to an apparatus especially designed for purifying water by removing the impurities therefrom through the action of a chemical solution, light air and gravity.

The main object of the invention is to purify storm or reservoir water and render it potable by intimately mixing with the water a small quantity of a solution of innocuous chemical salt agitating and aerating it, and passing it into sedimentation and aerating basins where the impurities such as mud, silt and similar substances including vegetation, are coagulated and precipitated to the bottom of the basins and the water rendered transparent to enable the sunlight to destroy any bacteria remaining therein and prepare the water for use.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a diagrammatical view disclosing the relative relation of tanks forming a part of the apparatus.

Figure 2 is a side elevational view of the tanks.

Figure 3 is an enlarged sectional view through the chemical mixing tank.

Figure 4 is a fragmental sectional view disclosing the pipe for directing fluid from the tank.

Referring to the drawings in detail, the present apparatus is of a capacity to require the use of three tanks indicated by the reference characters 5, 5' and 5", it being understood however that the number and size of the tanks may be varied to meet the requirements of usage.

These tanks or sedimentation basins may be constructed of any suitable material but are preferably built in circular formation, the lower portions thereof being partly disposed below the ground surface to anchor the basins against movement.

The bottoms of these basins are indicated at 6, and are preferably inverted cone-shaped so that the precipitated impurities will move towards the center thereof where the impurities may be drained therefrom, the drain pipe indicated at 7 having communication with the basins at the central portions thereof.

Associated with the basins 5, 5' and 5", is a tank 8 which is divided by the wall 9 into an upper compartment 10, and a lower compartment 11, the wall 12 forming one wall of the compartment 11 being spaced from the wall 13 of the tank 8 to provide a passageway 14 for purposes to be hereinafter more fully described.

A chamber 15 forms a part of the tank 8 and is especially designed for containing suitable chemical salt crystals, there being provided an inlet pipe 16 designed to discharge water into the passageway 14. The main water supply pipe is indicated at 17 and is in communication with a suitable reservoir not shown, the outlet end 18 being disposed within the tank 8 at a point above the wall 9, so that fluid to be treated may be directed to the compartment 10 of the tank.

The pipe 19 provides communication between the receptacle 15 and end 18 of the pipe 17 so that the chemical solution in receptacle 15 may be directed to the pipe 17 in the path of travel of the fluid passing through pipe 17 so that the chemical solution will become thoroughly mixed with the water prior to its entrance to compartment 10.

The passageway 14 directs the fluid from compartment 10 to the basin feed pipes 20 which have their discharge ends disposed at angles as at 21 and arranged adjacent to the walls of the basins so that fluid will enter the basins at one side thereof, necessitating the passage of the fluid to the center of the basins to discharge therefrom.

On the passage of the fluid through passageway 14, the fluid contacts with baffles 22 that are arranged in staggered relation with respect to each other and disposed within the path of travel of the fluid. Thus it will be seen that foreign matter in the water will be obstructed in its passage from the compartment 10 to the end that sediment will fall to the bottom of the passageway.

Arranged within the basins 5, 5' and 5" are the pipes 23 that are formed with perforations in their upper sides to discharge air into the basins at points beneath the surface of the fluid in the basins, causing the fluid to be thoroughly aerated.

The pipes 23 are in communication with pipes 24 that in turn are connected with the pipe 25 which is in communication with a suitable source of air supply not shown. Valves 26 control the passage of air to the pipes 23 so that any one of the pipes may be cut off while the fluid in the remaining basins is being treated.

An air delivering pipe 27 is positioned in compartment 10 at a point below the discharge ends of the pipe 18 so that as the fluid enters the compartment 10 the air will be forced therethrough. A valve member 27 controls the passage of fluid through the pipe 17 while valve members 28 control the passage of fluid through the discharge pipes 7. Valve members 29 are provided to control the passage of fluid to the basins 5. Reference character 30 designates valve members adapted to control the passage of fluid to the service pipe 31, through which the fluid is directed after the fluid has been treated.

When water is to be purified through the use of the apparatus as described, a quantity of chemical salt preferably lumps of aluminum sulphate crystals, is placed in the receptacle 15 and the valve controlling the passage of fluid through pipe 16 opened, admitting water to the receptacle 15.

The valve controlling the passage of fluid through pipe 17, is now opened, discharging fluid into compartment 10 at the same time picking up portions of the chemical solution discharged from the receptacle 15.

Compressed air is now directed to the pipes 27 purifying the water on its passage through the compartment 10. The water and chemical solution thus mixed, drops into the trap under the chemical chamber 15 and falls on the baffles 22, where the fluid flows into the pipes 20. As shown, the water is discharged from the ends 21 of pipes 20, tangentially to the circumference of the basins, giving the water a rotary motion around the center of the basins and over the perforated pipes 23 located near the bottom of the basins.

Compressed air escaping from the perforations in the pipes 23 agitates and aerates the water and removes all noxious odors and gases. When one basin is filled, all the valves are closed and the valve controlling the passage of fluid from the basin is opened allowing fluid to pass to another basin and the water permitted to assume a condition of perfect quiet, for several hours during which time the solution of chemical salt in the water coagulates the mud, silt and other impurities contained therein including vegetation and bacteria. The impurities thus coagulated fall to the bottom of the basin. The bottom of the basin being lowest near its center, the coagulated impurities roll down the sloping sides of the bottom to the center.

After the mud, silt and other foreign matter have collected on the bottom of the basin, the water being now clear of color and transparent, the bacteria remaining therein are destroyed by the direct action of sunlight.

This action is repeated according to the number of basins employed in the system.

After the water has been thoroughly purified it may of course be carried off through the service pipe for use.

I claim:—

1. An apparatus for purifying water including basins, a tank for feeding material to the basins, a horizontal partition member in the tank dividing the tank into upper and lower compartments, a vertical partition connected with the horizontal partitioning member defining a lateral passageway communicating with the upper compartment, a water feed pipe extending into the upper feed compartment, and having its discharge end disposed beyond the lateral passageway, a pipe leading from the chamber and extending into the feed pipe to deliver a chemical material to the feed pipe, at a point in spaced relation with its discharge end, downwardly inclined baffles extending into the lateral passageway, and a pipe for directing fluid from the tank to the basins.

2. An apparatus for purifying water including basins having inclined bottoms, a tank forming a part of the apparatus and having an upper aerating compartment and having a vertical passageway communicating with the aerating compartment, means at the lower end of the tank for delivering water from the tank to the basins, a water feed pipe extending into the upper compartment, a chemical chamber above the aerating compartment, a pipe leading from the chemical chamber to the water feed pipe for depositing chemicals in the feed pipe, and baffles arranged within the vertical passageway.

In testimony that I claim the foregoing as my own, I have hereto affixed my signature.

JOHN BROWN FENDER.